United States Patent [19]

Heese et al.

[11] 4,134,774
[45] Jan. 16, 1979

[54] AGGREGATE FOR CONCRETE AND CONCRETE COMPOSITION CONTAINING SAME

[75] Inventors: Dieter Heese, Bochum; Gerhard Hausberg, Essen-Bresdeney; Hans Lehmann, Goslar; Hans-Joachim Schmidt, Goslar-Hahndorf; Klaus Goldschmidt; Kyaw Than, both of Essen, all of Germany

[73] Assignee: STEAG Aktiengesellschaft, Essen, Germany

[21] Appl. No.: 774,149

[22] Filed: Mar. 3, 1977

[30] Foreign Application Priority Data

Mar. 4, 1976 [DE] Fed. Rep. of Germany ....... 2608927

[51] Int. Cl.² ................................................ C04B 7/02
[52] U.S. Cl. ........................................ 106/97; 106/98; 106/109; 106/117
[58] Field of Search ................... 106/97, 98, 105, 109, 106/117, DIG. 1, 288 EE; 61/35 B

[56] References Cited

U.S. PATENT DOCUMENTS

| | | | |
|---|---|---|---|
| 3,785,840 | 1/1974 | Minnick et al. | 106/DIG. 1 |
| 4,040,852 | 8/1977 | Jones | 106/97 |

*Primary Examiner*—James Poer
*Attorney, Agent, or Firm*—Karl F. Ross

[57] ABSTRACT

Concrete, especially for producing concrete blocks of high compressive strength, is formed from a hydraulic binder and an improved aggregate which consists of 0.1:1 to 1:0.1 parts of a sludge to comminuted slag. The sludge is a calcium-containing product of the scrubbing of the flue gases of a fossil-fuel boiler, preferably of a power plant, while the slag can be melting-chamber slag or ash obtained from the furnace. The composition may also contain sand or gravel. It is combined with water, to be cast into cement blocks of high compressive strength. Low proportions of the hydraulic binder are required with the improved aggregate.

9 Claims, 1 Drawing Figure

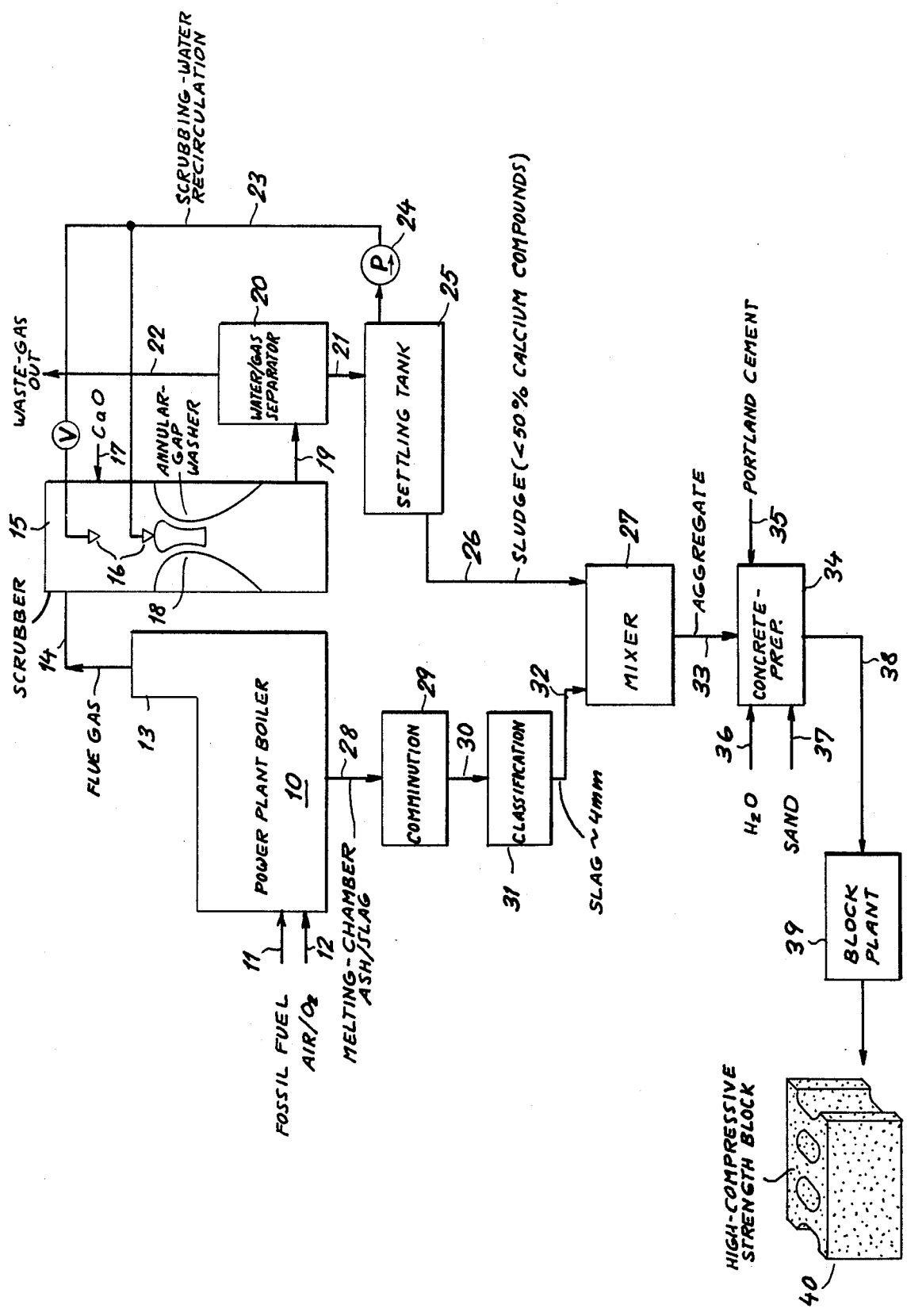

AGGREGATE FOR CONCRETE AND CONCRETE COMPOSITION CONTAINING SAME

FIELD OF THE INVENTION

The present invention relates to an improved aggregate for hydraulic-cement concretes, especially for the production of concrete products of high-compressive strength, to an improved cement composition containing a new aggregate, and to a method of making cement products or cement compositions with high-compressive strength.

BACKGROUND OF THE INVENTION

In electric power plants operating with fossil fuels, the flue gases contain fly ash and other solids as well as acidic gaseous components such as sulfur oxides which must be scrubbed or otherwise removed from the gases before they are released into the atmosphere to prevent environmental pollution.

It is a common practice to provide downstream of an electric power plant boiler apparatus for the wet removal of dust and for the scrubbing of sulfur oxide from the waste or flue gas. The wet washing and scrubbing or desulfurization process produces a sludge of characteristic composition associated with the use of fossil fuels; this sludge presents a problem of disposal.

In this connection, it is known to pass the exhaust gases into a tower with or without annular-gap washers for the simultaneous dust removal and desulfurization of the gas using a scrubbing liquid, generally water. Water-soluble components of the gas stream saturate the scrubbing water and particulates are entrained from the gas stream in water droplets which are collected in a water-gas separator or the like. The process can include the condensation of water as part of the separation operation and the collected liquid with the entrained particulates can be conducted to a sedimentation tank in which a sludge settles from the excess liquid, which, in turn, may be recirculated to a scrubber.

While a certain proportion of the sulfur oxides are removed by solubilization in water, it is a conventional process to include the removal of the sulfur oxides by introducing into the scrubbing finely divided alkaline additives, such as particles of lime (calcium oxide) which form condensation nuclei about which condensates form, the alkaline additives reacting with the sulfur oxide to produce, for example, the corresponding calcium salts. The latter are present in the sludge.

Power plant boilers also produce so-called "melting-chamber slag" or scale or ash formed by fusion in the combustion chamber which must periodically be removed. Elimination, on the one hand of the aforementioned sludge and, on the other hand, the slag is a problem if environmental pollution is to be avoided.

It has been proposed heretofore in, for example, German patent DT-PS 1,817,001 to recover the sludge from the dust scrubbing and desulfurization devices of a power plant and to mix the sludge with molten melting-chamber slag to granulate the latter and simultaneously dewater the sludge with the sensible heat of the slag. The resulting solid mixture is used as an aggregate for concrete after being milled. Experiments have shown that such an aggregate does not produce a concrete of high-compressive strength, or for that matter, a concrete which for a given compressive strength, permits a reduction in the amount of the hydraulic binder which is employed.

It has also been proposed to use broken melting-chamber slag as an additive or aggregate for concrete (see German patent DT-PS 1,176,547 and German patent application DT-AS 1,228,984). Even with these systems, however, for a given proportion of hydraulic binder, e.g. portland cement, the concrete has only its customary compressive strength. The utility of the aggregate is thus limited even for those functions for which it has been found to be advantageous, namely, structures in which thermal conductivity should be limited.

Finally, it has been proposed to react a sludge obtained by the water-scrubbing desulfurization of flue gases with the dust obtained by a dry dust removal operation to produce a stone-like aggregate (open German application DT-OS 24 00 350). While these granulates can be used as an aggregate for concrete, this aggregate does not improve the compressive strength thereof.

OBJECTS OF THE INVENTION

It is the principal object of the present invention, therefore, to provide an improved aggregate for use in the production of concretes, especially with hydraulic cement binders, whereby the disadvantages of the earlier systems discussed above are obviated.

It is another object of the invention to provide an improved aggregate which, on the other hand, eliminates the disposal problems of fossil-fuel binders, and, on the other hand, enables the production of concrete of high-compressive strength, especially for use in concrete blocks.

It is also an object of our invention, therefore, to provide an improved method of making high-compressive strength concrete blocks at low cost.

A further object of our invention is to provide an improved concrete composition which can be used in the fabrication of concrete blocks of high-compressive strength.

SUMMARY OF THE INVENTION

The invention is based upon our most surprising discovery that, when the sludge containing particulates and resulting from the wet scrubbing of the flue gases of a fossil-fuel power plant boiler is combined with the melting-chamber slag or ash recovered from the boiler in a weight ratio of sludge to slag between 0.1:1 and 1:0.1, the resulting aggregate can be combined with a reduced amount of hydraulic binder, especially portland cement (by comparison with other concrete) to yield a concrete composition which sets and hardens to an especially high-compressive strength and which is particularly suitable for use in the fabrication of high-compressive strength cement blocks. Preferably, the ratio of sludge to slag by weight is 1:1 to 1:2.

Preferably, the sludge contains a high concentration of calcium compounds and is obtained in the wet scrubbing and desulfurization process by the addition of alkaline additives in the scrubber. Preferably, sufficient lime is fed to the scrubber that the sludge consists of 40–50% by weight of calcium compounds. Best results have been obtained when the calcium compound component of the sludge consists of 79% calcium sulfite, 10% calcium sulfate, 10% calcium carbonate, the balance is impurities.

The melting-chamber slag or ash should have a particle size of about 4 mm, i.e. 4 mm ± 0.5 mm.

When comminuted melting-chamber slag is used together with the sludge from the wet washing of the fluw gases of a fossil-fuel power plant boiler, in admixture as an aggregate for concrete, the concrete bodies which are formed have a surprisingly high compressive strength. This is especially the case when the sludge is that which is obtained from a simultaneous dust removing and desulfurization scrubbing operation. For a given compressive strength of the concrete bodies, therefore, the cement proportion can be reduced.

Naturally, other aggregates can be used together with the aggregate of the invention, for example, sand or gravel.

BRIEF DESCRIPTION OF THE DRAWING

The above and other objects, features and advantages of the present invention will become more readily apparent from the following description, reference being made to the accompanying drawing in which:

the sole FIGURE is a flow diagram illustrating the practice of the present invention.

SPECIFIC DESCRIPTION

In the drawing we have shown a power plant boiler 10 which can be of any conventional construction and whose burners can be supplied with any conventional fossil fuel at 11, the usual combustion-system gas, e.g. air, oxygen-enriched air or oxygen being supplied at 12. The term "fossil fuel" is here used to refer to coal and coal products (e.g. gasified coal), petroleum products (such as fuel oils, natural gas and petroleum cracking fractions), and any other organic combustibles giving rise to a sulfur-containing particle-entraining flue gas and melting-chamber ash or slag.

The flue gas is led from the stack 13 of the boiler and is conducted, as represented at 14, to a scrubber 15 which can be of the type described in U.S. Pat. No. 3,844,744 or U.S. Pat. Nos. 3,140,163, 3,199,267 and 3,726,065.

The scrubber 15 can have a preliminary spray-type washer and an annular-gap washer 18, each of which has a spray head 16 for spraying the washing and scrubbing liquid into the tower.

Lime in finely divided form can be introduced at 17 to function as a nucleating agent and to react with the sulfur compounds in the flue gas. The gases and liquid are then introduced at 19 into a separating stage 20, represented schematically but operating with the same principle as the prior art separators described in the cited applications and patents, the purified waste gas being discharged at 22 while the liquid-solid slurry is delivered to a settling tank 25 as represented at 21. Decanted liquid is recirculated by a pump 24 and lime 23 to the spray heads 16.

The sludge from the settling tank 25 containing a high concentration of calcium compounds, is delivered at 26 to a mixer 27 where it is combined with a slag as supplied at 32.

The melting-chamber ash or slag is withdrawn from the boiler 10 as represented at 28, which can be comminuted by grinding at 29, and then is fed (line 30) to a classifier 31 which can be of a screen type to recover the slag particles of a particle size of about 4 mm. The slag is delivered at 32 to a mixer 27 previously noted.

The resulting aggregate can be fed at 33 to a concrete preparation stage to which the portland cement (arrow 35) and any additional aggregates such as sand or gravel (arrow 37) is also supplied. If water is necessary to obtain the proper consistency, it is added as shown at 36. The resulting concrete can be introduced into a block-making machine at a plant 39 to produce a high-compressive strength cement block 40 shown in the drawing.

Specific Example 30 parts by weight of a sludge obtained by the scrubbing of the flue gas of a power plant with water and introducing lime for desulfurization is mixed with 41 parts by weight of melting-chamber ash comminuted to a particle size of 4 mm. This aggregate mixture is blended with 10 parts by weight of portland cement 450 and the balance sand to 100% by weight in a force-mixing system. Water is added to the proper consistency for block pouring and cement blocks are cast therefrom and hardened in the conventional manner after settling under vibration and pressure. The sludge contained 45% by weight of a calcium compound component consisting of 79% by weight of calcium sulfite, 10% by weight calcium sulfate and 10% by weight calcium carbonate. The compressive strength of the blocks was 430 kp/cm$^2$. The strength of a test cube was 500 kp/cm$^2$ (kp = kg force − kgf).

We claim:
1. A process for producing concrete blocks of high-compressive strength comprising the steps of:
   (a) burning a fossil fuel in an electric power plant boiler to produce a flue gas containing dust particles and sulfur oxides while forming a melting-chamber slag in said boiler;
   (b) treating said flue gas with water in the presence of calcium oxide to scrub said particles from said gas and form calcium compounds including calcium sulfite and calcium sulfate in the scrubbing water;
   (c) settling said scrubbing water to produce a sludge containing 40 to 50% by weight of said calcium compounds;
   (d) removing said slag from said boiler and comminuting same to produce a comminuted slag;
   (e) combining the sludge of step (c) with the slag of step (d) in a weight ratio of sludge to slag between 0.1:1 to 1:0.1 to form an aggregate;
   (f) mixing the aggregate produced in step (e) with portland cement, with water and with sand or gravel to produce a casting concrete composition, the cement making up about 10% by weight of the aggregate, cement and sand or gravel mixture; and
   (g) casting said casting concrete composition into forms to produce blocks and hardening said blocks.
2. The method defined in claim 1 wherein said slag has a particle size of about 4 mm and said ratio is between 1:1 and 1:2.
3. The method defined in claim 2 wherein said composition consists essentially of:
   30% by weight of said sludge,
   41% by weight of said slag,
   10% by weight of portland cement, and
   the balance to 100% of sand, the water being added in any amount sufficient to enable the casting of said composition.
4. A concrete comprising an aggregate which consists of a mixture of a sludge settled from a liquid produced by wet dust removal, desulfurization and scrubbing of the flue gas of a fossil-fuel power plant boiler, and a comminuted melting-chamber slag obtained from said boiler, the ratio of sludge to slag being 0.1:1 to 1:0.1; about 10% by weight of a hydraulic cement binder; sand or gravel and water to produce a body of high-compressive strength.

5. The concrete defined in claim 4 wherein said ratio is 1:1 to 1:2.

6. The concrete defined in claim 5 wherein said sludge contains substantially 40 to 50% by weight of calcium compounds including calcium sulfite and calcium sulfate.

7. The concrete defined in claim 6 wherein said slag has a particle size of about 4 mm.

8. A concrete block formed from the concrete composition defined in claim 5.

9. A method of improving the compressive strength of concrete which consists of recovering a sludge from the wet dust removal and desulfurization and scrubbing of the flue gas of a fossil-fuel power plant boiler, withdrawing melting-chamber slag from said boiler, comminuting said slag, mixing said sludge with said slag in a ratio of sludge to slag of 0.1:1 to 1:0.1 and introducing the mixture into a concrete composition for the production of high-compressive strength concrete bodies, the composition containing about 10% by weight of portland cement.

* * * * *